US012743666B2

(12) United States Patent
Regikumar et al.

(10) Patent No.: US 12,743,666 B2
(45) Date of Patent: Sep. 22, 2026

(54) METHOD AND SYSTEM OF TRAINING OF CHAINED NEURAL NETWORKS FOR DELAY PREDICTION IN TRANSIT NETWORKS

(71) Applicant: Tata Consultancy Services Limited, Mumbai (IN)

(72) Inventors: Rohith Regikumar, Chennai (IN); Priyanga Kasthurirajan, Chennai (IN); Arvind Ramanujam, Chennai (IN); Rajesh Jayaprakash, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 381 days.

(21) Appl. No.: 18/493,639

(22) Filed: Oct. 24, 2023

(65) Prior Publication Data

US 2024/0330787 A1 Oct. 3, 2024

(30) Foreign Application Priority Data

Mar. 31, 2023 (IN) ............................ 202321024889

(51) Int. Cl.
*G06Q 10/04* (2023.01)
*G06Q 50/40* (2024.01)

(52) U.S. Cl.
CPC ............ *G06Q 10/04* (2013.01); *G06Q 50/40* (2024.01)

(58) Field of Classification Search
None
See application file for complete search history.

(56) References Cited

U.S. PATENT DOCUMENTS

2015/0317558 A1* 11/2015 Adachi .................... G06N 3/04 706/19
2019/0084600 A1* 3/2019 Davidich .............. G06N 20/00
(Continued)

FOREIGN PATENT DOCUMENTS

CN 113887655 A 1/2022
EP 3869414 A1 8/2021

OTHER PUBLICATIONS

R. Regikumar, P. Kasthurirajan, A. Ramanujam and R. Jayaprakash, “TrainChaiNN—A Train Delay Prediction Model Using Chained Adversarial Neural Networks,” 2023 IEEE 26th International Conference on Intelligent Transportation Systems (ITSC), Bilbao, Spain, 2023, pp. 3908-3913 (Year: 2023).*
(Continued)

*Primary Examiner* — Folashade Anderson
(74) *Attorney, Agent, or Firm* — FINNEGAN, HENDERSON, FARABOW, GARRETT & DUNNER LLP

(57) ABSTRACT

State of the art approaches for training chained neural network models for delay prediction train the data models using only real data and not predicted data. Such models when used in a chained way leads to worse results as they are not exposed to predicted data during training. This leads to the model prediction errors showing sharp increase as the models tries to predict for subsequent stations past the immediate station. Embodiments disclosed herein provide a method and system for training of chained neural networks for delay prediction in transit networks. In this approach, a chained neural network model used by the system is trained such that data containing a mix of real data and predicted data is used for training each data model in a sequence of data models in the chained neural network model.

16 Claims, 11 Drawing Sheets

(56) References Cited

U.S. PATENT DOCUMENTS

| | | | | |
|---|---|---|---|---|
| 2022/0215760 | A1* | 7/2022 | Jorgensen | G08G 5/56 |
| 2023/0244866 | A1* | 8/2023 | Agrawal | G06N 3/045 715/811 |
| 2024/0112096 | A1* | 4/2024 | Regikumar | G06N 3/0464 |
| 2025/0103926 | A1* | 3/2025 | Garg | B60L 53/64 |

OTHER PUBLICATIONS

J. Pineda-Jaramillo, F. Bigi, T. Bosi, F. Viti, and A. D'Ariano "Short-Term Arrival Delay Time Prediction in Freight Rail Operations Using Data-Driven Models" IEEE Access, 2023 pp. 46966-46978. (Year: 2023).*

Pu Wang, Qing-peng Zhang, Train delay analysis and prediction based on big data fusion, Transportation Safety and Environment, vol. 1, Issue 1, Jul. 1, 2019, pp. 79-88 (Year: 2019).*

Zaamout, Khobaib et al., "Improving Neural Networks Classification Through Chaining", Title of the item: Proceedings of the 22nd international conference on Artificial Neural Networks and Machine Learning—vol. Part II, Date: 2012, Link: https://www.researchgate.net/publication/262161484_Improving_Neural_Networks_Classification_through_Chaining.

Chen, Jun et al., "Chained Predictions of Flight Delay Using Machine Learning", Title of the item: AIAA Science and Technology Forum and Exposition, Date: 2019, Link: https://www.researchgate.net/publication/330185077_Chained_Predictions_of_Flight_Delay_Using_Machine_Learning.

* cited by examiner

METHOD AND SYSTEM OF TRAINING OF CHAINED NEURAL NETWORKS FOR DELAY PREDICTION IN TRANSIT NETWORKS

PRIORITY CLAIM

This U.S. patent application claims priority under 35 U.S.C. § 119 to: Indian Patent Application No. 202321024889, filed on Mar. 31, 2023. The entire contents of the aforementioned application are incorporated herein by reference.

TECHNICAL FIELD

The disclosure herein generally relates to delay prediction in transit networks, and, more particularly, to a method and system for training of chained neural networks for delay prediction in transit networks.

BACKGROUND

In addition to operational impacts, delays in transit networks like trains adversely impact the journey plans of passengers which have proven economic impact on society at large. The ability to accurately predict delays in advance is therefore crucial for transport operators to manage and mitigate them. For example, the transit network being considered maybe a train network. In train networks, each train follows a schedule in which the train reaches different stations in a defined sequence, at a scheduled time. It has been observed that if train arrives late at a particular station, the delay may propagate to other stations in the sequence, causing uncertainty in interconnected journey planning.

The delay prediction maybe considered as similar to target value prediction. One of the machine learning approaches used for the target value prediction is chained neural network models, in which a series of neural networks, connected in a chained fashion, is trained and used for the target value prediction. While training the chained neural network models, input data as well as prediction from previous model in the sequence are fed as input to next data model in the sequence. State of the art approaches for training the chained neural network models try to reduce prediction error for the same target value across the chain, and are not capable of predicting values for a sequence of targets.

SUMMARY

Embodiments of the present disclosure present technological improvements as solutions to one or more of the above-mentioned technical problems recognized by the inventors in conventional systems. For example, in one embodiment, a processor implemented method is provided. Initially, information on a) scheduled arrival time, b) actual arrival time, c) scheduled departure time, and d) actual departure time, of a plurality of vehicles for one or more scheduled trips for a plurality of stations is received via one or more hardware processors, as training data. Further, a set of spatiotemporal features of each of the plurality of vehicles for the plurality of stations is identified via the one or more hardware processors, by processing the training data, wherein the set of spatiotemporal features comprise an arrival delay and a departure delay for the plurality of stations. Further, a chained neural network is trained using the set of spatiotemporal features to generate a trained neural network model. Training the chained neural network includes the following steps. Initially, the arrival delay and the departure delay for each of the plurality of vehicles at a first future station among a plurality of future stations in each of the one or more scheduled trips is predicted by processing the set of spatiotemporal features using a first neural network model among a plurality of neural network models forming the chained neural network. Further, the arrival delay and the departure delay is predicted for each of the plurality of vehicles at one or more of a plurality of future stations subsequent to the first future station in each of the one or more scheduled trips, by each of a plurality of neural network models subsequent to the first neural network model in the chained neural network, wherein each of the plurality of neural network models subsequent to the first neural network model predicts the arrival delay and the departure delay by processing information on at least one of a) the arrival delay and departure delay at a pre-defined number of previous stations, and b) the predicted arrival delay and the predicted departure delay from a pre-defined number of previous neural network models.

In another embodiment, the set of spatiotemporal features of each of the plurality of vehicles for the plurality of stations is identified based on a travel history information of each of the plurality of vehicles obtained from at least one data source.

In another embodiment, each of a plurality of neural network models is configured to predict the arrival delay and the departure delay for one or more of the plurality of stations.

In yet another embodiment, a chain length of the chained neural network depends on one or more characteristics of a network obtained through analysis of the training data.

In yet another embodiment, a final neural network model in a sequence of the plurality of neural network models forming the chained neural network is used to predict the arrival delay and the departure delay at all remaining future stations greater than the chain length for each of the plurality of vehicles in each of the one or more scheduled trips.

In yet another embodiment, a system is provided. The system includes one or more hardware processors, a communication interface, and a memory storing a plurality of instructions. The plurality of instructions cause the one or more hardware processors to receive information on a) scheduled arrival time, b) actual arrival time, c) scheduled departure time, and d) actual departure time, of a plurality of vehicles for one or more scheduled trips for a plurality of stations, as training data. Further, a set of spatiotemporal features of each of the plurality of vehicles for the plurality of stations is identified via the one or more hardware processors, by processing the training data, wherein the set of spatiotemporal features comprise an arrival delay and a departure delay for the plurality of stations. Further, a chained neural network is trained using the set of spatiotemporal features to generate a trained neural network model. Training the chained neural network includes the following steps. Initially, the arrival delay and the departure delay for each of the plurality of vehicles at a first future station among a plurality of future stations in each of the one or more scheduled trips is predicted by processing the set of spatiotemporal features using a first neural network model among a plurality of neural network models forming the chained neural network. Further, the arrival delay and the departure delay is predicted for each of the plurality of vehicles at one or more of a plurality of future stations subsequent to the first future station in each of the one or more scheduled trips, by each of a plurality of neural network models subsequent to the first neural network model in the chained neural network, wherein each of the plurality of neural network models subsequent to the first neural network model predicts the arrival delay and the departure delay by processing information on at least one of a) the arrival delay and departure delay at a pre-defined number of previous stations, and b) the predicted arrival delay and the predicted departure delay from a pre-defined number of previous neural network models.

In yet another embodiment, the system is configured to identify the set of spatiotemporal features of each of the plurality of vehicles for the plurality of stations based on a travel history information of each of the plurality of vehicles obtained from at least one data source.

In yet another embodiment, each of a plurality of neural network models in the system is configured to predict the arrival delay and the departure delay for one or more of the plurality of stations.

In yet another embodiment of the system, a chain length of the chained neural network depends on one or more characteristics of a network obtained through analysis of the training data.

In yet another embodiment, a final neural network model in a sequence of the plurality of neural network models forming the chained neural network of the system is used to predict the arrival delay and the departure delay at all remaining future stations greater than the chain length for each of the plurality of vehicles in each of the one or more scheduled trips.

In yet another aspect, a non-transitory computer readable medium is provided. The non-transitory computer readable medium includes a plurality of instructions, which when executed, causes one or more hardware processors to perform the following steps. Initially, information on a) scheduled arrival time, b) actual arrival time, c) scheduled departure time, and d) actual departure time, of a plurality of vehicles for one or more scheduled trips for a plurality of stations is received via one or more hardware processors, as training data. Further, a set of spatiotemporal features of each of the plurality of vehicles for the plurality of stations is identified via the one or more hardware processors, by processing the training data, wherein the set of spatiotemporal features comprise an arrival delay and a departure delay for the plurality of stations. Further, a chained neural network is trained using the set of spatiotemporal features to generate a trained neural network model. Training the chained neural network includes the following steps. Initially, the arrival delay and the departure delay for each of the plurality of vehicles at a first future station among a plurality of future stations in each of the one or more scheduled trips is predicted by processing the set of spatiotemporal features using a first neural network model among a plurality of neural network models forming the chained neural network. Further, the arrival delay and the departure delay is predicted for each of the plurality of vehicles at one or more of a plurality of future stations subsequent to the first future station in each of the one or more scheduled trips, by each of a plurality of neural network models subsequent to the first neural network model in the chained neural network, wherein each of the plurality of neural network models subsequent to the first neural network model predicts the arrival delay and the departure delay by processing information on at least one of a) the arrival delay and departure delay at a pre-defined number of previous stations, and b) the predicted arrival delay and the predicted departure delay from a pre-defined number of previous neural network models.

In yet another embodiment, the non-transitory computer readable medium causes the one or more hardware processors to identify the set of spatiotemporal features of each of the plurality of vehicles for the plurality of stations based on a travel history information of each of the plurality of vehicles obtained from at least one data source.

In another embodiment, the non-transitory computer readable medium causes each of a plurality of neural network models is configured to predict the arrival delay and the departure delay for one or more of the plurality of stations.

In yet another embodiment, a chain length of the chained neural network depends on one or more characteristics of a network obtained through analysis of the training data.

In yet another embodiment, the non-transitory computer readable medium causes the one or more hardware processors to predict the arrival delay and the departure delay at all remaining future stations greater than the chain length for each of the plurality of vehicles in each of the one or more scheduled trips using a final neural network model in a sequence of the plurality of neural network models forming the chained neural network.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The delay prediction maybe considered as similar to target value prediction. One of the machine learning approaches used for the target value prediction is chained neural network models, in which a series of neural networks, connected in a chained fashion, is trained and used for the target value prediction. While training the chained neural network models, input data as well as prediction from previous model in the sequence are fed as input to next data model in the sequence. State of the art approaches for training the chained neural network models try to reduce prediction error for the same target value across the chain, and are not capable of predicting values for a sequence of targets. For this reason, they are not suitable for delay prediction in the transit networks.

Figure 1A:
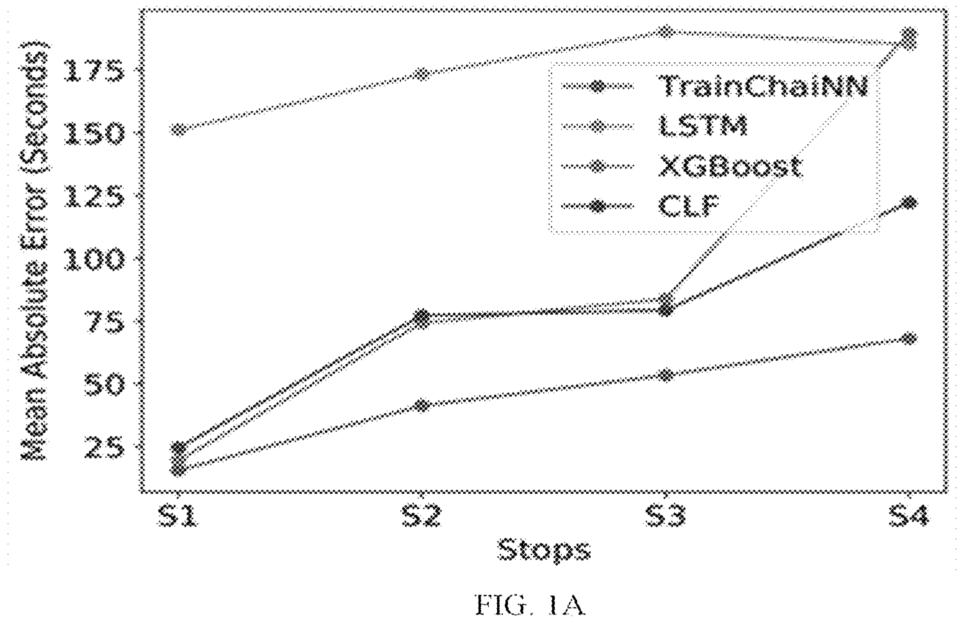
FIGS. 1A, 1C, and 1D depict data with respect to state of the art approaches, according to some embodiments of the present disclosure.

In machine learning, most relevant predictions that a model can make are based on it being given features from actual/real data. The model that is trained on input data fits the input data into a distribution or function such that:

f(x)=y_pred, where based on loss function used the difference between y_actual and y_pred is minimized.

where, f is a non-linear function, y_actual is actual target value, y_pred is predicted target value, and X is an input feature The plot in FIG. 1A shows an aggregated absolute error for 4 subsequent stops in a route across all trips for that for a period of a year. The prediction for stops after station S utilizes the part of the input and/or the prediction from the previous model in the chain. This ensures that every model captures the inherent cascading nature of the data. As is evident from the plots in FIG. 1A, the state of the art works fail as they try to predict past station S as showcased by the high Mean Absolute Error. In the case of scheduled public transit like trains the delays often has a cascade effect. This is depicted in the plot in FIG. 1B, which shows that delays knock-on/cascade up to at least 4 stations once it forms. It is apparent from the graph in FIG. 1B that the delay of a train at a given station strongly correlates to its delays in the previous stations. During the analysis conducted, the correlation was found to be weakening after 4 stations.

Let $S_1, S_2, \ldots S_n, S_{n+1}, \ldots S_{n=m}$ be the sequence of stations that a train traverses as part of a trip that it is currently undergoing. Further let Sn be the latest station at which the actual delay information of the train is known in real time.

Now consider one of the state of the art chained network models (depicted in FIG. 1C) which attempts to predict delays for stations $S_{n+1}$, $S_{n+2}$, $S_{n+3}$, and $S_{n+4}$ given the actual delays at stations $S_{n-2}$, $S_{n-1}$, and $S_n$. In this scenario the prediction from each input model is given to the next model in the chain with no input from the previous model in the chain being fed into it. There is a correlation of delays at 3 previous stations to the delay at a subsequent station. Model 2, Model 3 and Model 4 in considered the predicted delay only at the immediately preceding station. Any data similarly which showcases an influence of part of the previous input in a subsequent prediction cannot therefore be solved in this scenario. This model resulted in the big build-up of errors.

Figure 1B:
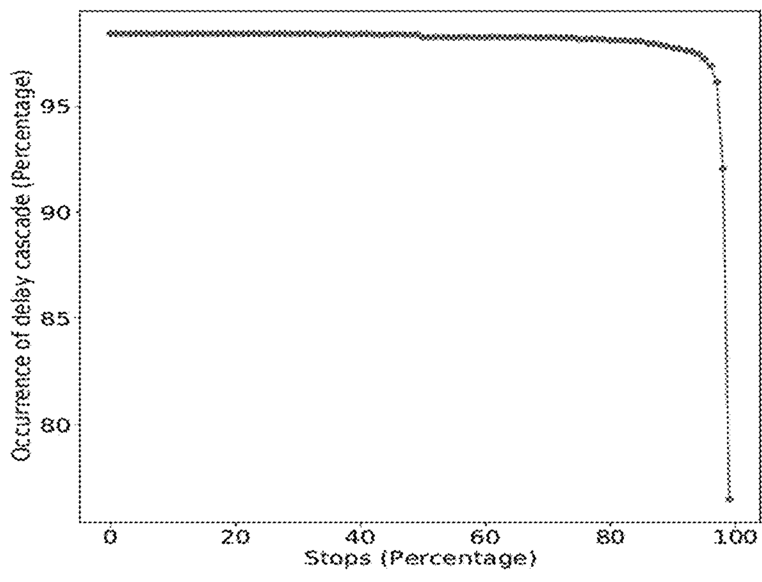
FIG. 1B depicts cascade effect of delays across stations, according to some embodiments of the present disclosure.
Figure 1C:
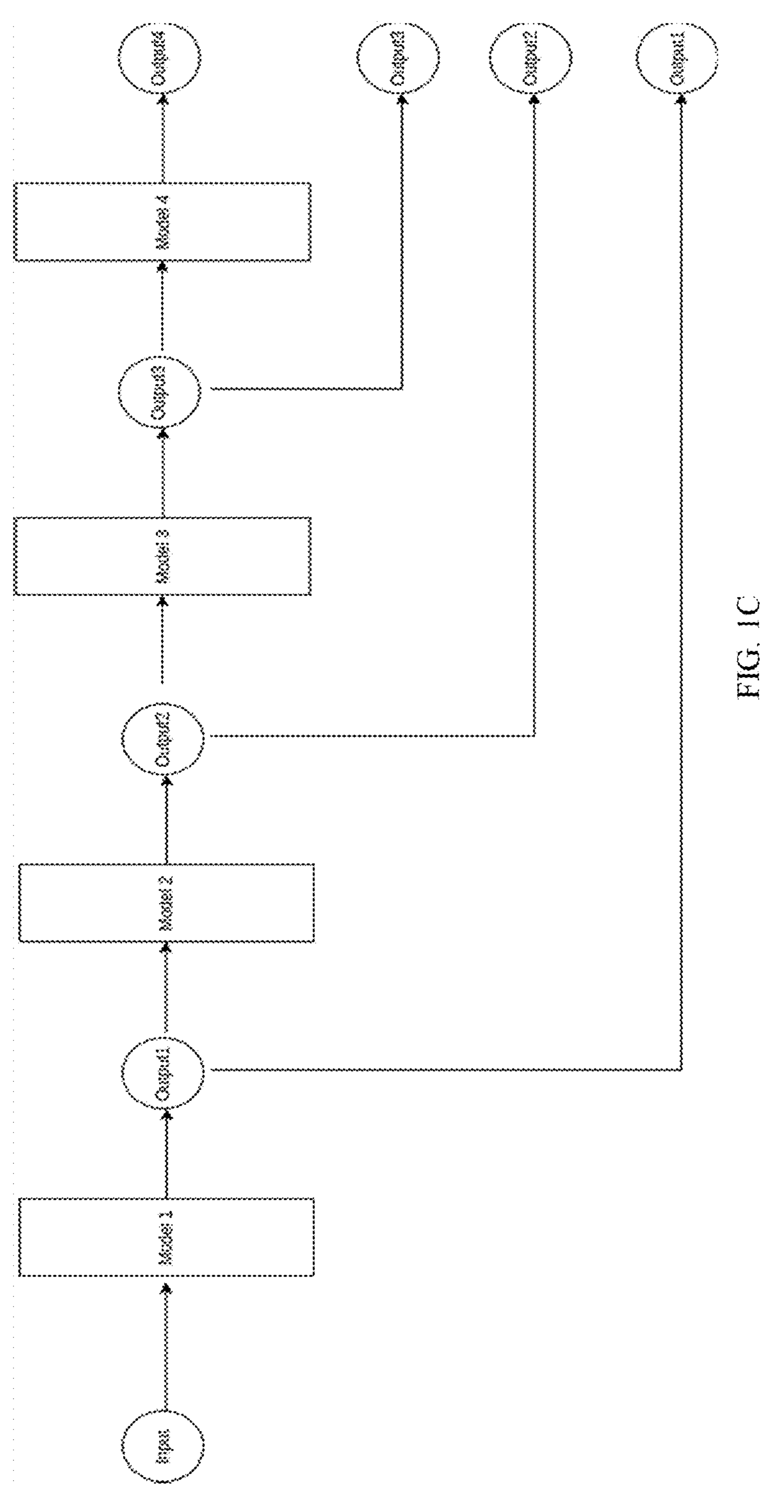
Figure 1D:
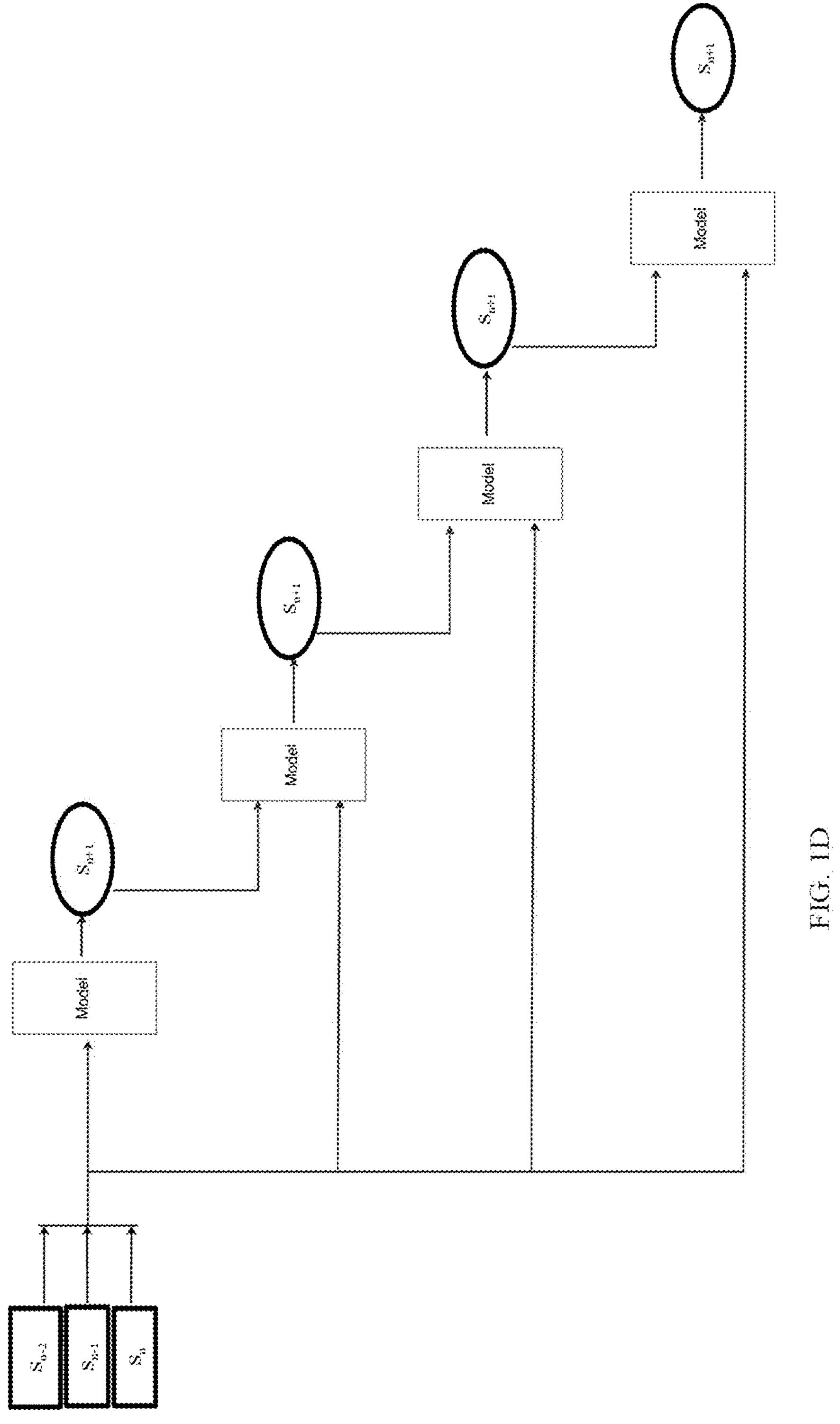

Another state of the art approach uses the chained network as depicted in FIG. 1D, in which entire input data and the prediction from previous model in chain are used to specifically predict for one station. In essence the output from each model in the chain is the delay for the same station, in this particular case $S_{n+1}$. The aim of this model is to reduce the error for the same target at each subsequent model in the chain and to finally have one model which has the least error for the single target value. Such a model also fails to make use of the underlying infrastructure in it's model architecture.

In order to address these challenges, a method and system for training of chained neural networks for delay prediction in transit networks is provided. Initially, information on a) scheduled arrival time, b) actual arrival time, c) scheduled departure time, and d) actual departure time, of a plurality of vehicles for one or more scheduled trips for a plurality of stations is received via one or more hardware processors, as training data. Further, a set of spatiotemporal features of each of the plurality of vehicles for the plurality of stations is identified via the one or more hardware processors, by processing the training data, wherein the set of spatiotemporal features comprise an arrival delay and a departure delay for the plurality of stations. Further, a chained neural network is trained using the set of spatiotemporal features (which comprises of real/input data and data predicted by the models) to generate a trained neural network model. Training the chained neural network includes the following steps. Initially, the arrival delay and the departure delay for each of the plurality of vehicles at a first future station among a plurality of future stations in each of the one or more scheduled trips is predicted by processing the set of spatiotemporal features using a first neural network model among a plurality of neural network models forming the chained neural network. Further, the arrival delay and the departure delay is predicted for each of the plurality of vehicles at one or more of a plurality of future stations subsequent to the first future station in each of the one or more scheduled trips, by each of a plurality of neural network models subsequent to the first neural network model in the chained neural network, wherein each of the plurality of neural network models subsequent to the first neural network model predicts the arrival delay and the departure delay by processing information on at least one of a) the arrival delay and departure delay at a pre-defined number of previous stations, and b) the predicted arrival delay and the predicted departure delay from a pre-defined number of previous neural network models.

Referring now to the drawings, and more particularly to FIG. 2 through FIG. 5G, where similar reference characters denote corresponding features consistently throughout the figures, there are shown preferred embodiments and these embodiments are described in the context of the following exemplary system and/or method.

Figure 2:
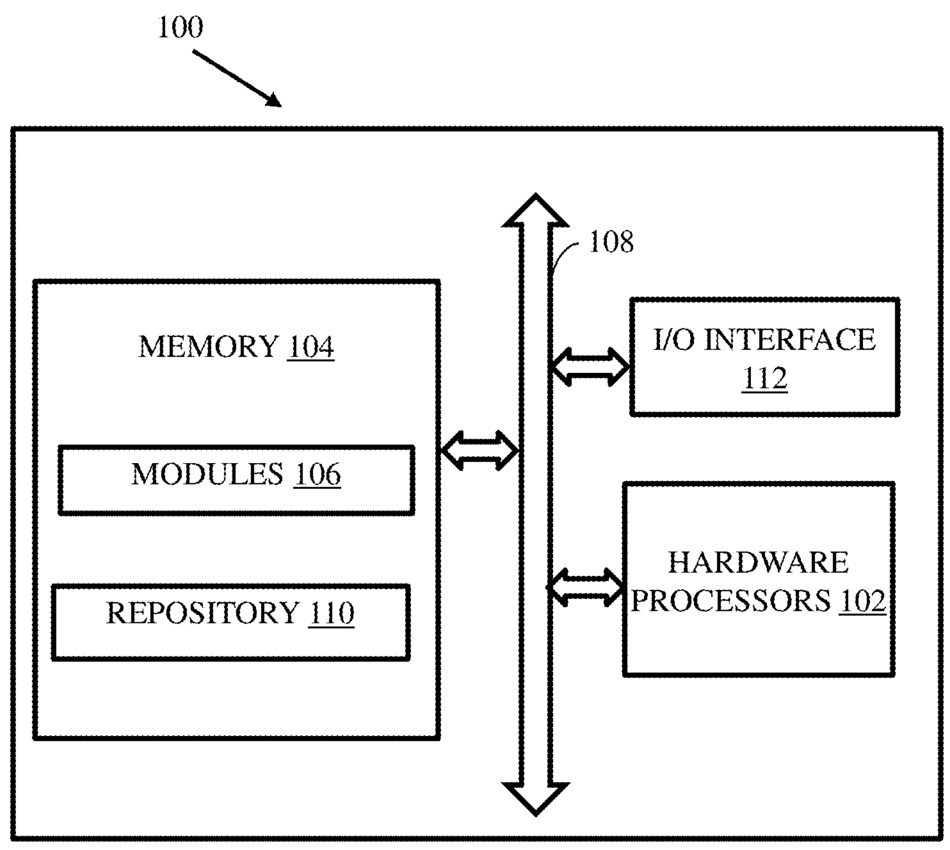
FIG. 2 illustrates an exemplary system for delay prediction in transit networks, according to some embodiments of the present disclosure.

FIG. 2 illustrates an exemplary system for delay prediction in transit networks, according to some embodiments of the present disclosure.

The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 106.

The plurality of modules 106 include programs or coded instructions that supplement applications or functions performed by the system 100 for executing different steps involved in the process of training of the chained neural networks for delay prediction in transit networks, being performed by the system 100. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the training of the chained neural networks for delay prediction in transit networks.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 2) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to the steps in flow diagram in FIG. 3 and the architecture depicted in FIG. 4.

Figure 3:
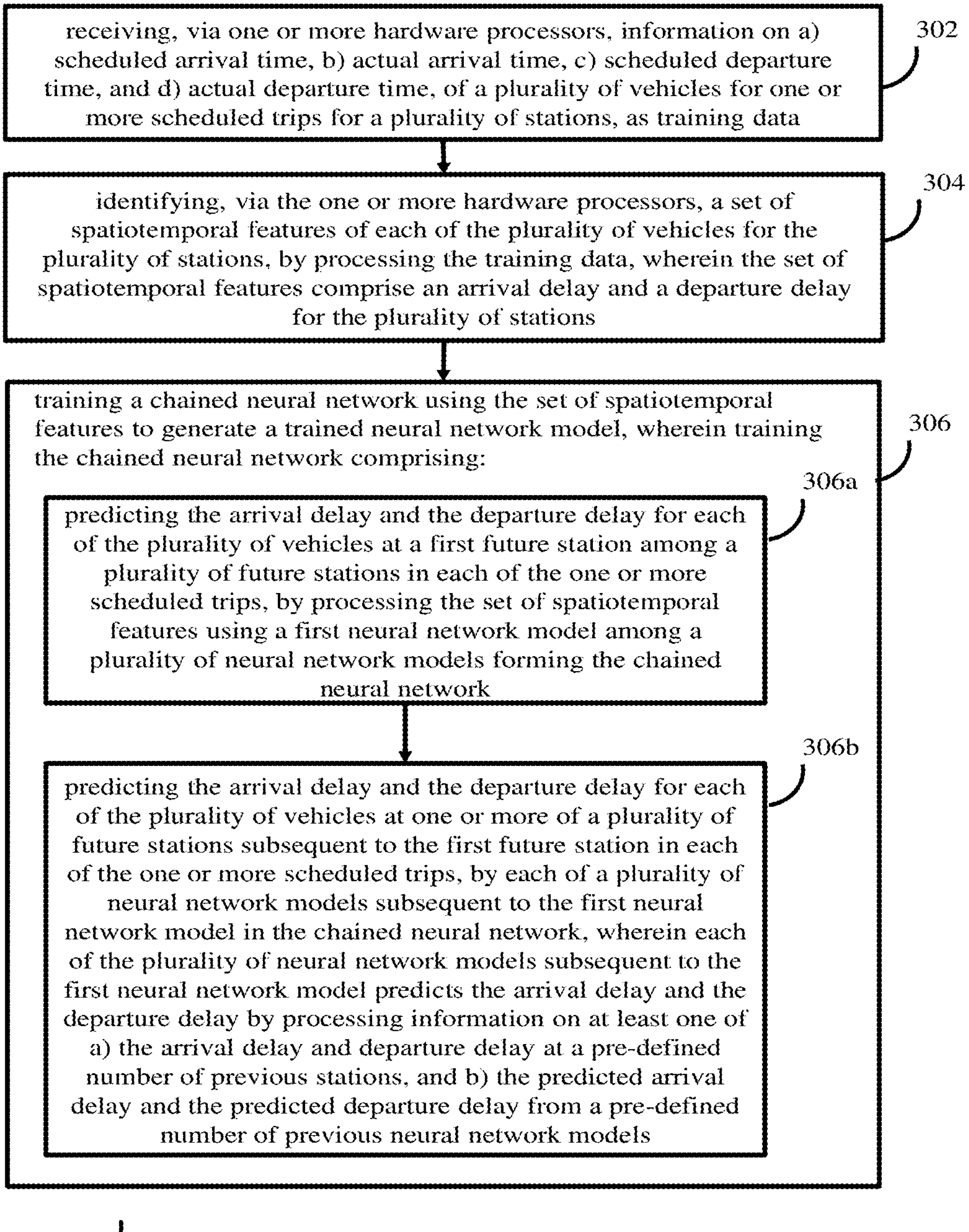
FIG. 3 is a flow diagram depicting steps involved in the process of delay prediction in the transit networks, by the system of FIG. 2, according to some embodiments of the present disclosure.

FIG. 3 is a flow diagram depicting steps involved in the process of delay prediction in the transit networks, by the system of FIG. 1, according to some embodiments of the present disclosure. In an embodiment, the system 100 comprises one or more data storage devices or the memory 104 operatively coupled to the processor(s) 102 and is configured to store instructions for execution of steps of the method 300 by the processor(s) or one or more hardware processors 102. The steps of the method 300 of the present disclosure will now be explained with reference to the components or blocks of the system 100 as depicted in FIG. 1 and the steps of flow diagram as depicted in FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of method 300 in FIG. 3, the system 100 receives information on a) scheduled arrival time, b) actual arrival time, c) scheduled departure time, and d) actual departure time, of a plurality of vehicles for one or more scheduled trips for a plurality of stations, via one or more hardware processors, as training data. In an embodiment, the system 100 is configured to be in communication with one or more data sources that may be external to the system 100, via appropriate interface(s), so as to receive/fetch the aforementioned information. In another embodiment, the system 100 may provide a suitable user interface for one or more authorized users to feed the information to the system 100.

Further, at step 304 of the method 300, a set of spatiotemporal features of each of the plurality of vehicles for the plurality of stations is identified via the one or more hardware processors, by processing the training data, wherein the set of spatiotemporal features comprise an arrival delay and a departure delay for the plurality of stations. The system 100 may identify value of the arrival delay as difference between the scheduled arrival time and the actual arrival time, which are obtained based on a travel history information of each of the plurality of vehicles. Similarly, the system 100 identifies value of the departure delay by comparing the scheduled departure time and the actual departure time, which are obtained based on a travel history information of each of the plurality of vehicles.

Figure 4A:
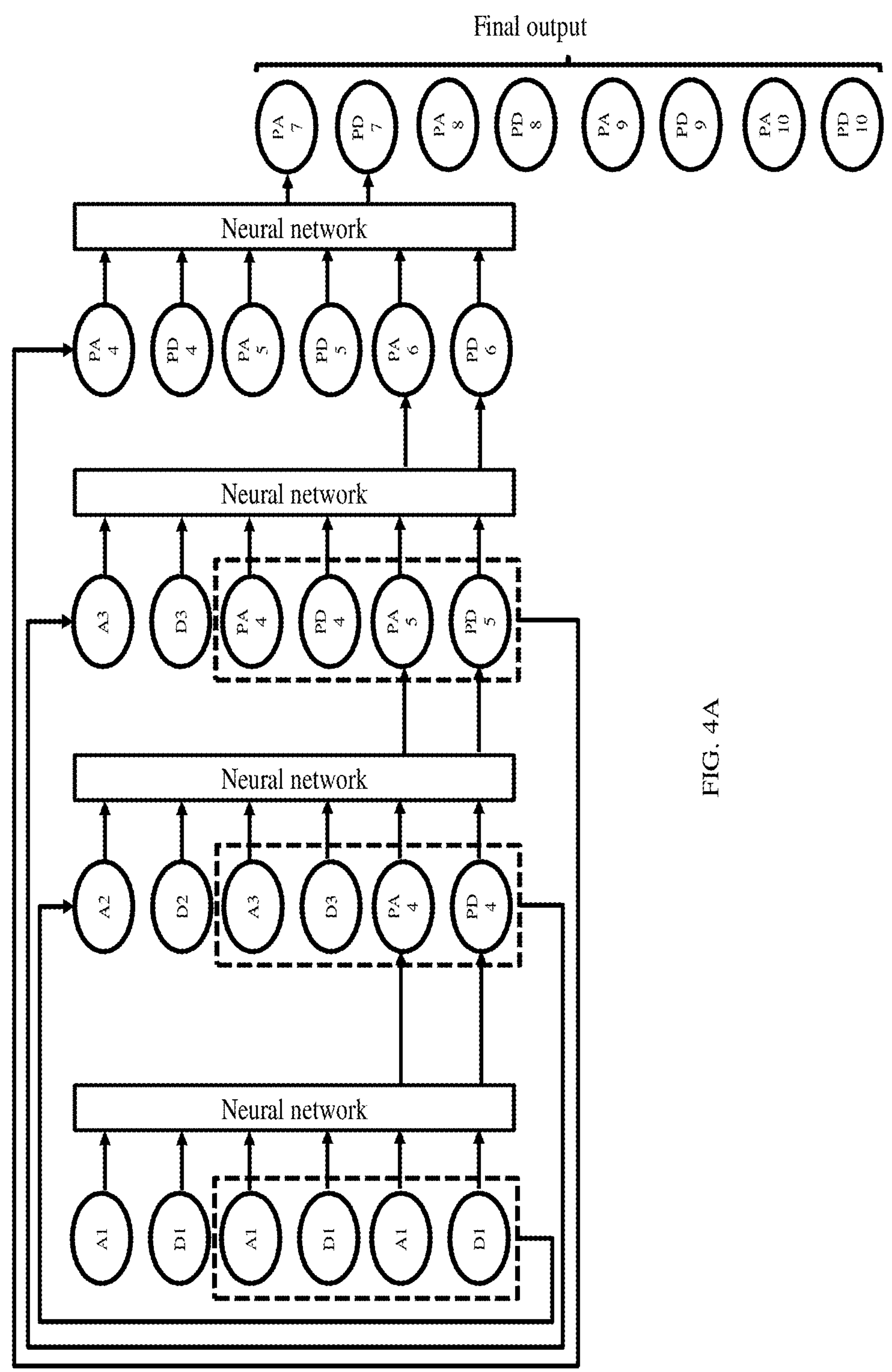
FIGS. 4A and 4B illustrate architecture of a chained neural network of the system of FIG. 2 in different forms, used for the delay prediction in the transit networks, in accordance with some embodiments of the present disclosure.
Figure 4B:
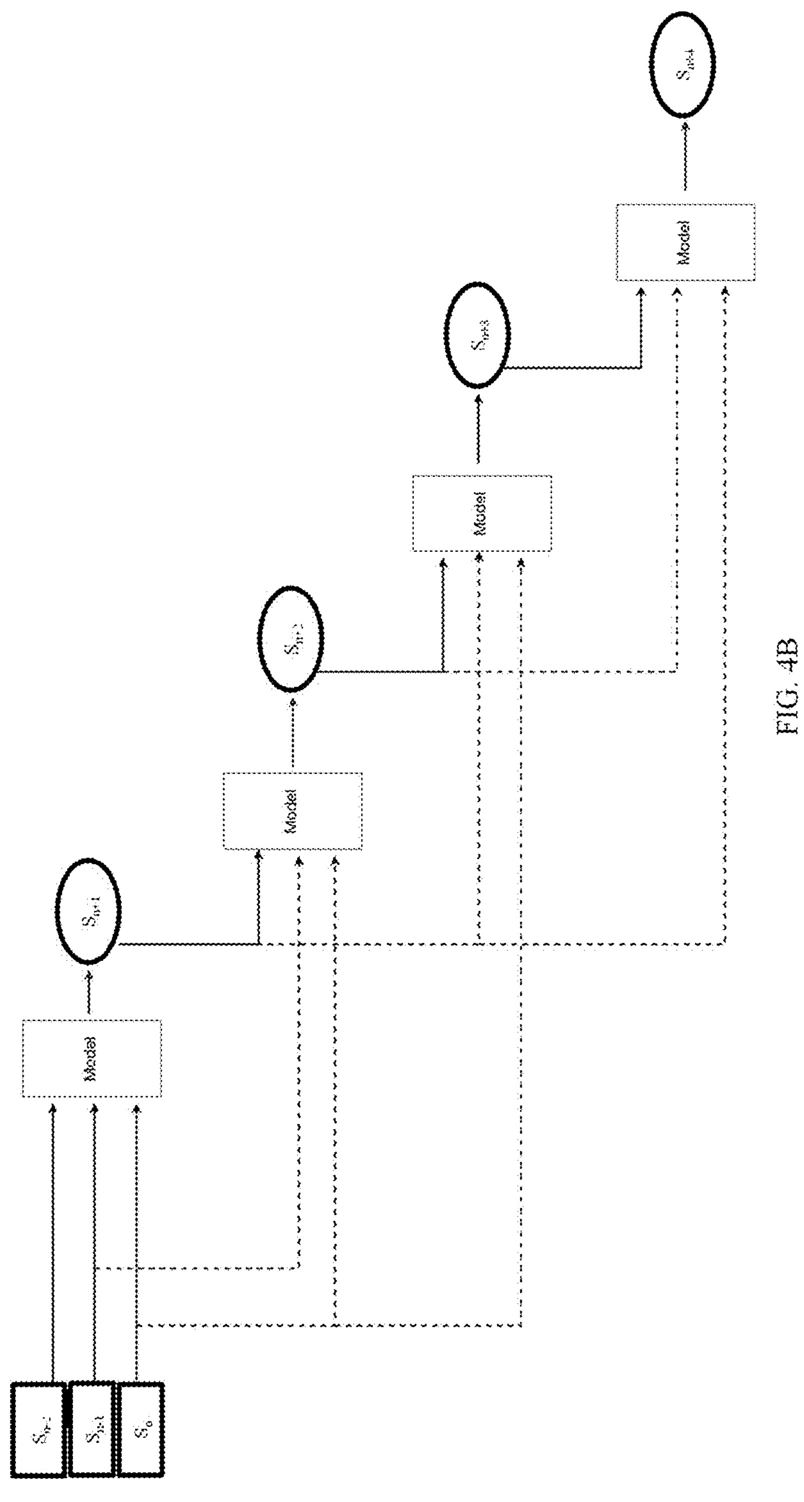

Further, at step 306 of the method 300, a chained neural network is trained using the set of spatiotemporal features to generate a trained neural network model. Architecture of the chained neural network is depicted in FIGS. 4A and 4B. As in FIGS. 4A and 4B, the chained neural network includes a plurality of neural networks connected in a sequence, thus forming the chained neural network. However, unlike the state of the art chained neural networks, instead of feeding all data (i.e. predicted data or real data) from previous data models, only partial data, i.e. data associated with previous N number of stations is fed to each subsequent neural network for training, wherein the value of N may be defined based on the cascade effect of delays as depicted in FIG. 1B. The data used for training each of the data models maybe a combination of predicted data (i.e. predictions from previous models) and real data (i.e. actual input data). Training the chained neural network includes the following steps. Initially, at step 306*a*, the arrival delay and the departure delay for each of the plurality of vehicles at a first future station among a plurality of future stations in each of the one or more scheduled trips is predicted by processing the set of spatiotemporal features using a first neural network model among a plurality of neural network models forming the chained neural network. Further, at step 306*b*, the arrival delay and the departure delay is predicted for each of the plurality of vehicles at one or more of a plurality of future stations subsequent to the first future station in each of the one or more scheduled trips, by each of a plurality of neural network models subsequent to the first neural network model in the chained neural network, wherein each of the plurality of neural network models subsequent to the first neural network model predicts the arrival delay and the departure delay by processing information on at least one of a) the arrival delay and departure delay at a pre-defined number of previous stations, i.e. real/actual data from pre-defined number of previous stations, and b) the predicted arrival delay and the predicted departure delay from a pre-defined number of previous neural network models. In an embodiment, value of the pre-defined number of previous stations is determined based on the cascade effect of the delay, as depicted in FIG. 1B. It is to be noted by a person skilled in the art that even though the architecture in FIGS. 4A and 4B depicts that the number of previous stations is three, the value may change based on the cascade effect, hence the architectures in FIGS. 4A and 4B are not to be construed as limiting scope of the embodiments disclosed herein. In another embodiment, each of a plurality of neural network models is configured to predict the arrival delay and the departure delay for one or more of the plurality of stations. In yet another embodiment, a chain length of the chained neural network and the value of the pre-defined number of previous stations depends on one or more characteristics of a network obtained through analysis of the training data. In yet another embodiment, a final neural network model in a sequence of the plurality of neural network models forming the chained neural network is used to predict the arrival delay and the departure delay at all remaining future stations larger than a chain length for each of the plurality of vehicles in each of the one or more scheduled trips.

The training of the chain neural network is explained below, in terms of a train network. A person skilled in the art would appreciate that this is for example purpose only, and is not intended to limit scope of the embodiments herein to train networks alone, rather, is applicable to any network that may have similar pattern/structure:

a. Problem Formulation:—

Consider that the railway network has stops: $S_1$, $S_2$, . . . , $S_n$. A route $R_j$ is defined as an ordered sequence of stops, which maybe a subset of the total Z stops that exist. Trips $T_k$ are generated for each route by assigning departure and arrival times for each stop in the route. The problem was formulated targeting the following questions:

1) When a trip experiences delay at a station $S_i$, does the delay cascade down to the subsequent stops? If so, in how many stops does it start dissipating?

2) Given arrival and departure times of an ongoing trip $T_k$ through a series of stops $S_1$, $S_2$ . . . . $S_n$ . . . , can a model predict subsequent delays for upcoming stops Sn+1, Sn+2, Sn+3, Sn+4 . . . ?

Notations used during explanation of the process are given in Table. 1

TABLE 1

| Time Table related parameters | |
|---|---|
| Parameter | Definition |
| S_i | A station |
| R_j | A Route |
| T_k | A trip |
| $delay_d(T_k, S_i)$ | Predicted departure delay of trip $T_k$ at station $S_i$ |
| $delay_a(T_k, S_i)$ | Predicted arrival delay of trip $T_k$ at station $S_i$ |
| A_h(T_k, S_i) | Historic average of arrival time of Trip T_k at station S_i |
| D_h(T_k, S_i) | Historic average of departure time of Trip T_k at station S_i |
| A_s(T_k, S_i) | Scheduled arrival time of Trip T_k at station S_i |
| D_s(T_k, S_i) | Scheduled departure time of Trip T_k at station S_i |
| A_p(T_k, S_i) | Predicted arrival time of Trip T_k at station S_i |
| D_p(T_k, S_i) | Predicted departure time of Trip T_k at station S_i |
| A_a(T_k, S_i) | Actual arrival time of Trip T_k at station S_i |
| D_a(T_k, S_i) | Actual departure time of Trip T_k at station S_i |
| $\mathcal{P}_{\omega w}$ | Number of stops inside a prediction window |
| $d_w$ | Number of stops in a window with prior data |
| x | Feature vector |
| y | Target delay |

To answer the first question, instances were computed using a sample data (which was historic data available from Infrabel and National Rail), where delays in trips seem to cluster in series of 2, 3, 4, . . . . It was observed that nearly 95% of the stops experienced cascaded delays from at most three stops upstream. It is demonstrated in FIG. 1B. The delays seemed to dissipate after more than four stops. The historical data used were of four types of arrival and departure times:

1) Scheduled values as published by the operators.

2) Actual values available from liveboards, APIs etc.

3) Values predicted by a model.

The features that delay models use can be spatial or temporal.

Spatial: This includes geospatial relationships between stations like inter-station distance, length of tracks, number of tracks per station etc.

Temporal: This includes the scheduled and actual liveboard data, dwell times, service time etc.

Using a feature importance analysis, it was determined that the features that most significantly affect the prediction are arrival and departure delay events at previous stations. The task is to learn a function f such that, if given an array X of arrival and departure delays from stations $S_{n-2}$, $S_{n-1}$, and $S_n$, the function computes y, such that $$f(X) = y \tag{1}$$

where y is the arrival and departure delay at the set of target stations $S_{n+1}$, $S_{n+2}$, $S_{n+3}$, $S_{n+4}$.

In an embodiment, in order to improve accuracy results, the chained neural network was trained in an adversarial setting.

The architecture of a trained chained network regressor consists of a generalized neural network with a single hidden layer repeated 4 times in a series as depicted in FIGS. 4A and 4B. Apart from the first model, each model in the sequence makes use of the prediction from the previous model and part of the feature vector fed to the previous model as input for its prediction. In an embodiment, a last model in the sequence may use only the predictions from previous models as input for prediction, and not the real data. The feature vector given to a model is taken and a first set of features for a stop being considered, in the sequence, are eliminated before concatenating with the predictions from the model before feeding to the next model in the chain. This results in effectively building a model for each of the four stations. Each model also has it's own critic network which further tries to tune the output from the model.

After training the models with and without critic, it was determined that adversarial learning has an added edge over the standard learning approach. The models are able to predict delays with less than half a minute of error for Sn+1 and with delays of less than one and a half minute for Sn+4, which is better than the current state of the art, and is more than enough for railway operators to make operational decisions.

Once trained, the chained neural network model used by the system 100 can be used for predicting the delays for one or more future stations, for any given future data within the same network the model was trained for. The chained neural network model was seen to be generalizable across entire network for all routes existing in the network.

Experimental Results

Datasets

The model was trained and tested on two datasets 1)—Historical data with respect to Belgium Rail, and 2) Historical data with respect to UK National Rail.

Setup

For the experiments, values were set as $p_w$=4 and $d_w$=3. The models were trained for 500 epochs utilizing Adam Optimizer. Learning rates were set to $10^{-4}$ and $2*10^{-4}$ for the regressor and critic respectively. The model was trained on a Linux container with 8 CPU cores and a 20 GB NVIDIA A100 GPU.

Results

Performance of the chained neural network of the system 100 was benchmarked against three models published in the literature: 1) Convolution Neural Networks LSTM Fully Connected Neural Networks (CLF), 2) Long Short Term Memory (LSTM), and 3) Extreme Gradient Boosting (XG-Boost). Each of these models may have used unique set of features for the delay prediction. The following arrival delay prediction experiments were performed:

1) Arrival delay for the next stop of a train One Stop Ahead.
2) Earlier than Scheduled Arrival-Negative Delay (Out-of-Distribution Data).
3) Delays greater than 60 minutes-Large Delays.
4) Arrival delays for the next four stops of a train-Four Stops Ahead.
5) Arrival delays of routes that weren't available in training set (Unknown Routes).
6) Journey Planning Based on Predicted Delays.

Figure 5A:
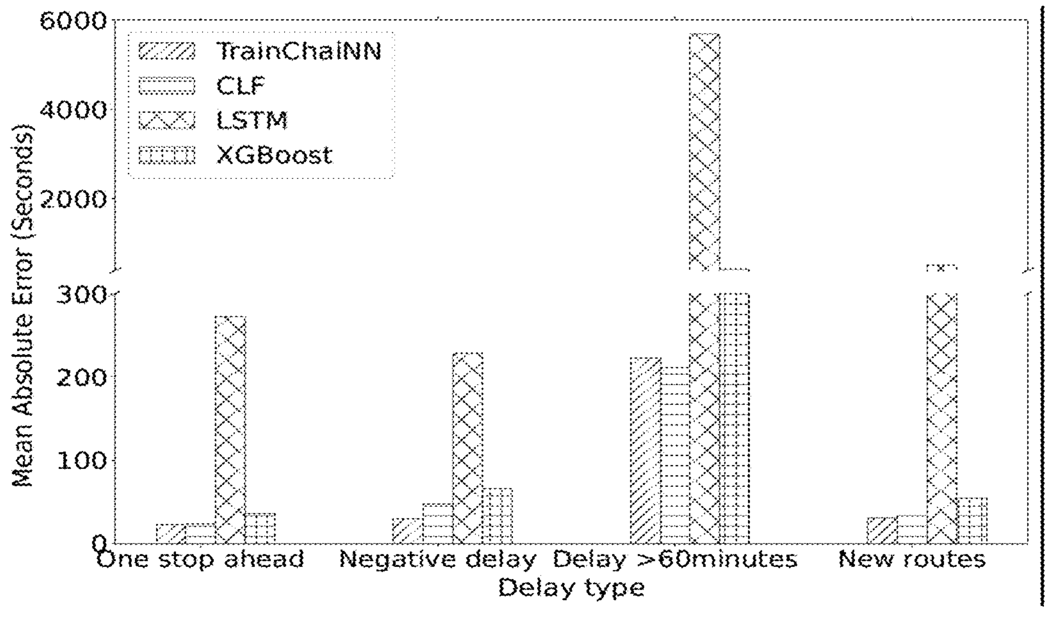
FIGS. 5A through 5G depict graphical representation of experimental data, in accordance with some embodiments of the present disclosure.
Figure 5B:
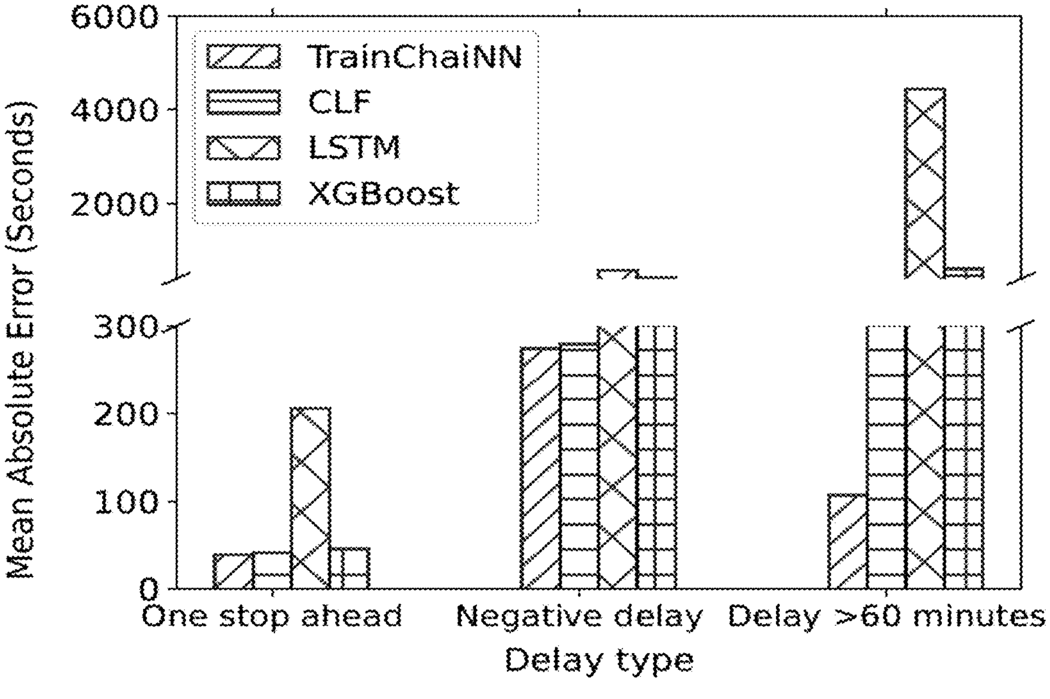
Figure 5C:
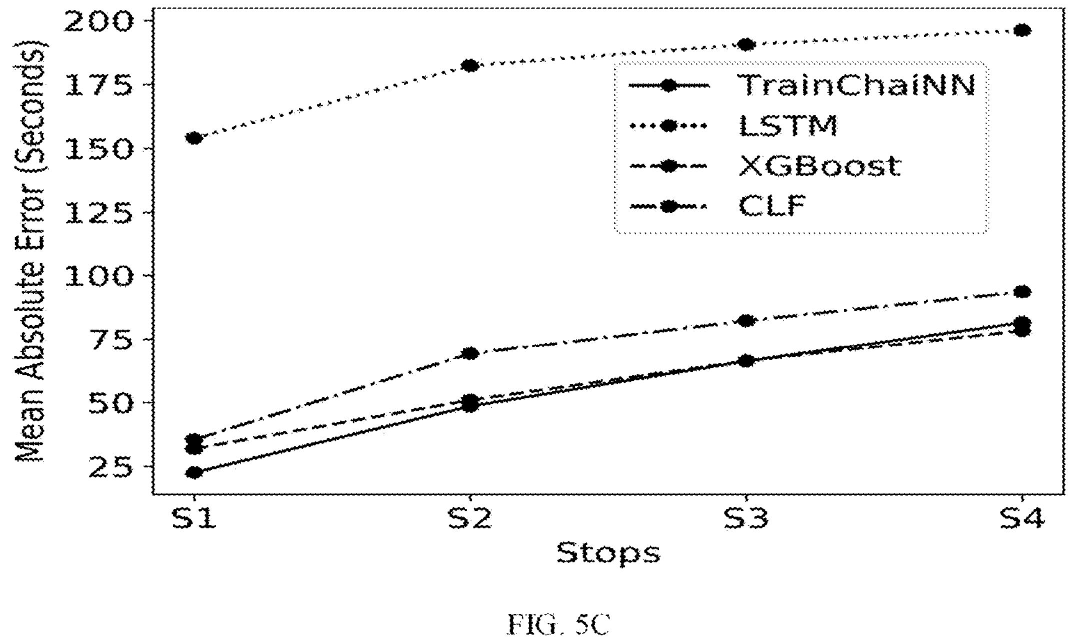
Figure 5D:
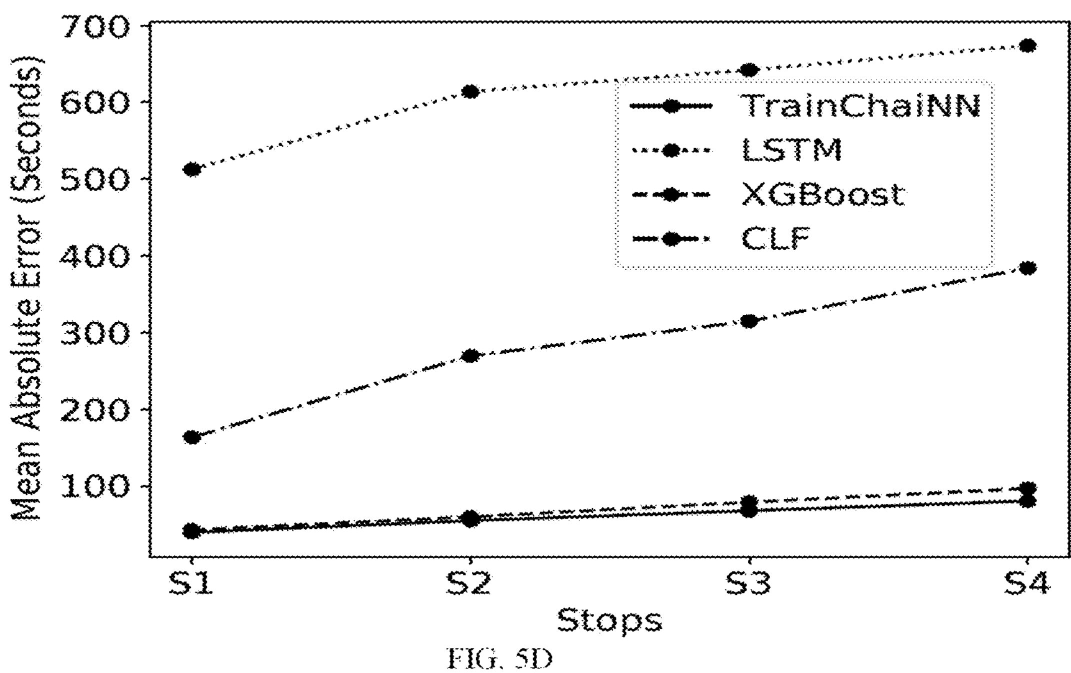

The FIGS. 5A and 5B provide Mean Absolute Error (MAE) results for One Stop Ahead, Negative Delay, Large Delays and unknown routes experiments. It was observed that TrainChaiNN's (name of the chained neural network model used by the system 100) MAE is lower than others except for one scenario in Infrabel's data. FIGS. 5C and 5D show the MAE for the Four Stops Ahead and experiments. TrainChaiNN is on-par with and nearly beats CLF. It was found to be outperforming other models.

In order to understand the real-world impact of the models, top 50 stations were considered by arrivals volume in both Infrabel and NationalRail. 12 days when the networks were experiencing highest average delays were considered. For those 12 days, shortest-travel time journeys between the stations for every 10 minutes. Minimum transfer time between trains was set to 7 minutes.

Figure 5E:
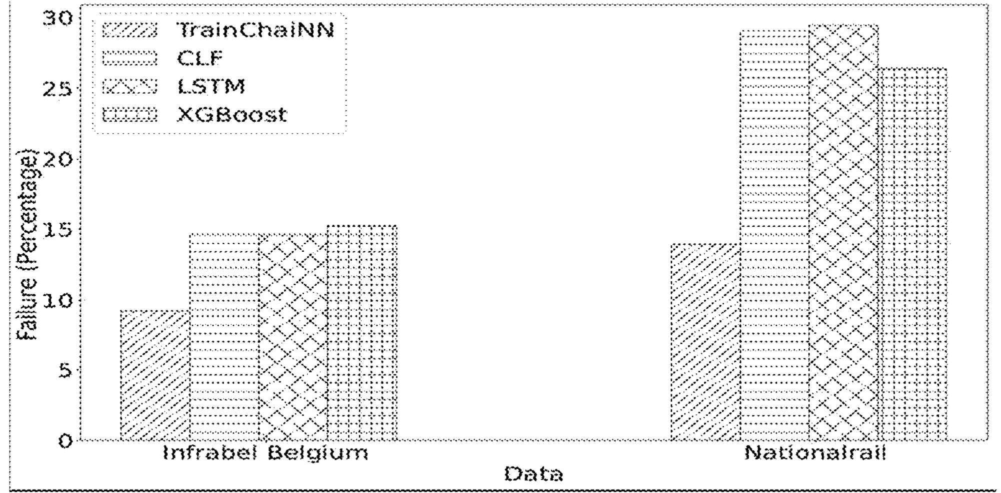
Figure 5F:
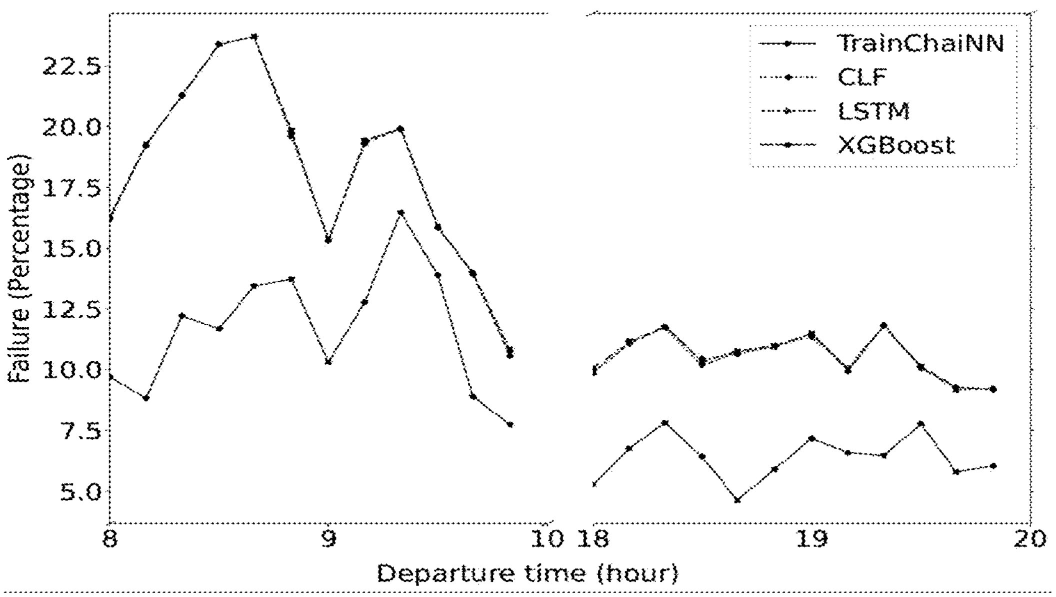
Figure 5G:
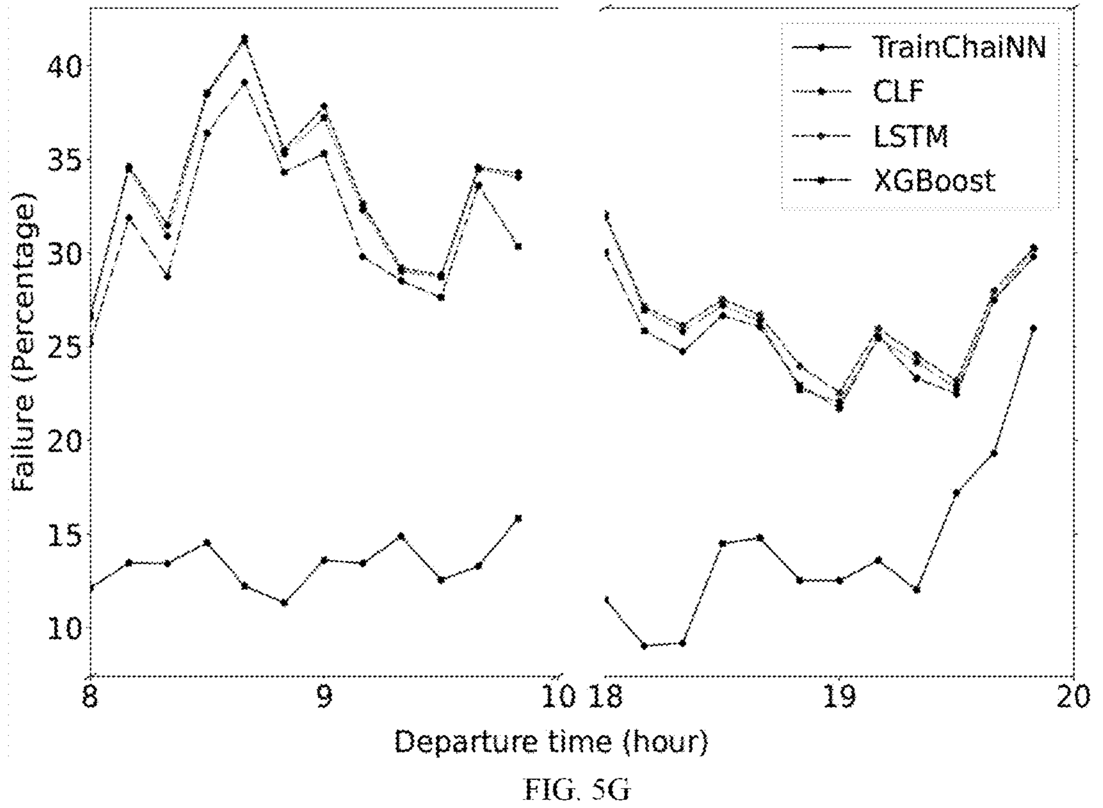

The journeys were computed using two timetables: timetable with actual arrival/departure times and the model predicted timetable. For a given input, the journey computed using model predicted timetable was set to be a 'failure' if its sequence of trains does not match with that of the corresponding journey computed using actual arrivals/departures or if the difference in travel time between them is more than 5 minutes. FIG. 5E compares the performance of TrainChaiNN with other models. It was observed that the failure rate was less than half of other models. Therefore, journeys which depend on TrainChaiNN had much better chances of surviving delays than other models. Crucially FIGS. 5F and 5G demonstrate that TrainChaiNN performs much better at crucial peak times across all days.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of delay prediction in transit networks. The embodiment, thus provides a method and system for training of chained neural networks for delay prediction in transit networks. Moreover, the embodiments herein further provide a mechanism of delay prediction using a trained chained neural network.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

receiving, via one or more hardware processors, information on a) scheduled arrival time, b) actual arrival time, c) scheduled departure time, and d) actual departure time, of a plurality of vehicles for one or more scheduled trips for a plurality of stations, as training data, wherein the training data is a combination of a real data and a predicted data;

identifying, via the one or more hardware processors, a set of spatiotemporal features of each of the plurality of vehicles for the plurality of stations, by processing the training data, wherein the set of spatiotemporal features comprise an arrival delay and a departure delay for the plurality of stations, wherein the set of spatiotemporal features comprises the real data and the predicted data; and training, via the one or more hardware processors, a chained neural network using the set of spatiotemporal features to generate a trained neural network model, wherein only partial data including data associated with previous N number of stations is fed to each subsequent neural network for training, wherein a value of the N number of previous stations is defined based on cascade effect of delays, wherein training the chained neural network comprising:

predicting the arrival delay and the departure delay for each of the plurality of vehicles at a first future station among a plurality of future stations in each of the one or more scheduled trips, by processing the set of spatiotemporal features using a first neural network model among a plurality of neural network models forming the chained neural network; and predicting the arrival delay and the departure delay for each of the plurality of vehicles at one or more of a plurality of future stations subsequent to the first future station in each of the one or more scheduled trips, by each of a plurality of neural network models subsequent to the first neural network model in the chained neural network, wherein each of the plurality of neural network models subsequent to the first neural network model predicts the arrival delay and the departure delay by processing information on combination of a) the real data comprising the arrival delay and departure delay at a pre-defined number of previous stations, and b) the predicted data comprising the predicted arrival delay and the predicted departure delay from a pre-defined number of previous neural network models, wherein the chained neural network is trained in an adversarial setting, thereby improve accuracy of the training, wherein each model in a sequence of the plurality of neural network models forming the chained neural network uses the prediction from a previous neural network model and part of a feature vector fed to the previous neural network model is used as input for the prediction, wherein the feature vector provided to the model is processed to eliminate a first set of features corresponding to a stop under consideration in a sequence prior to concatenating with the predictions generated by the model before feeding to a next model in the model chain, wherein the chained neural network trained in the adversarial setting are configured to predict delays with an error of less than half a minute for a first stop and with an error of less than one and a half minute for a subsequent stop, thereby reducing a failure rate to less than half of other models;

performing operational decisions by railway operators using the predicted delays.

2. The processor implemented method of claim 1, wherein set of spatiotemporal features of each of the plurality of vehicles for the plurality of stations is identified based on a travel history information of each of the plurality of vehicles obtained from at least one data source.

3. The processor implemented method of claim 1, wherein each of a plurality of neural network models is configured to predict the arrival delay and the departure delay for one or more of the plurality of stations.

4. The processor implemented method of claim 1, wherein a chain length of the chained neural network depends on one or more characteristics of a network obtained through analysis of the training data.

5. The processor implemented method of claim 4, wherein a final neural network model in a sequence of the plurality of neural network models forming the chained neural network is used to predict the arrival delay and the departure delay at all remaining future stations greater than the chain length for each of the plurality of vehicles in each of the one or more scheduled trips.

6. The processor implemented method of claim 1, wherein the training data is received from external data sources in communication with a system or from one or more authorized users through a suitable user interface to feed the information to the system.

7. A system, comprising:

one or more hardware processors;

a communication interface; and a memory storing a plurality of instructions, wherein the plurality of instructions cause the one or more hardware processors to:

receive information on a) scheduled arrival time, b) actual arrival time, c) scheduled departure time, and d) actual departure time, of a plurality of vehicles for one or more scheduled trips for a plurality of stations, as training data, wherein the training data is a combination of a real data and a predicted data;

identify a set of spatiotemporal features of each of the plurality of vehicles for the plurality of stations, by processing the training data, wherein the set of spatiotemporal features comprise an arrival delay and a departure delay for the plurality of stations, wherein the set of spatiotemporal features comprises the real data and the predicted data; and train a chained neural network using the set of spatiotemporal features to generate a trained neural network model, wherein only partial data including data associated with previous N number of stations is fed to each subsequent neural network for training, wherein a value of the N number of previous stations is defined based on cascade effect of delays, by:

predicting the arrival delay and the departure delay for each of the plurality of vehicles at a first future station among a plurality of future stations in each of the one or more scheduled trips, by processing the set of spatiotemporal features using a first neural network model among a plurality of neural network models forming the chained neural network; and predicting the arrival delay and the departure delay for each of the plurality of vehicles at one or more of a plurality of future stations subsequent to the first future station in each of the one or more scheduled trips, by each of a plurality of neural network models subsequent to the first neural network model in the chained neural network, wherein each of the plurality of neural network models subsequent to the first neural network model predicts the arrival delay and the departure delay by processing information on combination of a) the real data comprising the arrival delay and departure delay at a pre-defined number of previous stations, and b) the predicted data comprising the predicted arrival delay and the predicted departure delay from a pre-defined number of previous neural network models, wherein the chained neural network is trained in an adversarial setting, thereby improve accuracy of the training, wherein each model in a sequence of the plurality of neural network models forming the chained neural network uses the prediction from a previous neural network model and part of a feature vector fed to the previous neural network model is used as input for the prediction, wherein the feature vector provided to the model is processed to eliminate a first set of features corresponding to a stop under consideration in a sequence prior to concatenating with the predictions generated by the model before feeding to a next model in the model chain, wherein the chained neural network trained in the adversarial setting are configured to predict delays with an error of less than half a minute for a first stop and with an error of less than one and a half minute for a subsequent stop, thereby reducing a failure rate to less than half of other models;

performing operational decisions by railway operators using the predicted delays.

8. The system of claim 7, wherein the one or more hardware processors are configured to identify the set of spatiotemporal features of each of the plurality of vehicles for the plurality of stations, based on a travel history information of each of the plurality of vehicles obtained from at least one data source.

9. The system of claim 7, wherein each of a plurality of neural network models is configured to predict the arrival delay and the departure delay for one or more of the plurality of stations.

10. The system of claim 7, wherein a chain length of the chained neural network depends on one or more characteristics of a network obtained through analysis of the training data.

11. The system of claim 10, wherein a final neural network model in a sequence of the plurality of neural network models forming the chained neural network is used to predict the arrival delay and the departure delay at all remaining future stations greater than the chain length for each of the plurality of vehicles in each of the one or more scheduled trips.

12. One or more non-transitory machine-readable information storage mediums comprising one or more instructions which when executed by one or more hardware processors cause:

receiving information on a) scheduled arrival time, b) actual arrival time, c) scheduled departure time, and d) actual departure time, of a plurality of vehicles for one or more scheduled trips for a plurality of stations, as training data, wherein the training data is a combination of a real data and a predicted data;

identifying a set of spatiotemporal features of each of the plurality of vehicles for the plurality of stations, by processing the training data, wherein the set of spatiotemporal features comprise an arrival delay and a departure delay for the plurality of stations, wherein the set of spatiotemporal features comprises the real data and the predicted data; and training a chained neural network using the set of spatiotemporal features to generate a trained neural network model, wherein only partial data including data associated with previous N number of stations is fed to each subsequent neural network for training, wherein a value of the N number of previous stations is defined based on cascade effect of delays, wherein training the chained neural network comprising:

predicting the arrival delay and the departure delay for each of the plurality of vehicles at a first future station among a plurality of future stations in each of the one or more scheduled trips, by processing the set of spatiotemporal features using a first neural network model among a plurality of neural network models forming the chained neural network; and predicting the arrival delay and the departure delay for each of the plurality of vehicles at one or more of a plurality of future stations subsequent to the first future station in each of the one or more scheduled trips, by each of a plurality of neural network models subsequent to the first neural network model in the chained neural network, wherein each of the plurality of neural network models subsequent to the first neural network model predicts the arrival delay and the departure delay by processing information on combination of a) the arrival delay and departure delay at a pre-defined number of previous stations, and b) the predicted arrival delay and the predicted departure delay from a pre-defined number of previous neural network models, wherein the chained neural network is trained in an adversarial setting, thereby improve accuracy of the training, wherein each model in a sequence of the plurality of neural network models forming the chained neural network uses the prediction from a previous neural network model and part of a feature vector fed to the previous neural network model is used as input for the prediction, wherein the feature vector provided to the model is processed to eliminate a first set of features corresponding to a stop under consideration in a sequence prior to concatenating with the predictions generated by the model before feeding to a next model in the model chain, wherein the chained neural network trained in the adversarial setting are configured to predict delays with an error of less than half a minute for a first stop and with an error of less than one and a half minute for a subsequent stop, thereby reducing a failure rate to less than half of other models;

performing operational decisions by railway operators using the predicted delays.

13. The one or more non-transitory machine-readable information storage mediums of claim 12, wherein set of spatiotemporal features of each of the plurality of vehicles for the plurality of stations is identified based on a travel history information of each of the plurality of vehicles obtained from at least one data source.

14. The one or more non-transitory machine-readable information storage mediums of claim 12, wherein each of a plurality of neural network models is configured to predict the arrival delay and the departure delay for one or more of the plurality of stations.

15. The one or more non-transitory machine-readable information storage mediums of claim 12, wherein a chain length of the chained neural network depends on one or more characteristics of a network obtained through analysis of the training data.

16. The one or more non-transitory machine-readable information storage mediums of claim 15, wherein a final neural network model in a sequence of the plurality of neural network models forming the chained neural network is used to predict the arrival delay and the departure delay at all remaining future stations greater than the chain length for each of the plurality of vehicles in each of the one or more scheduled trips.

* * * * *